Figure 1:
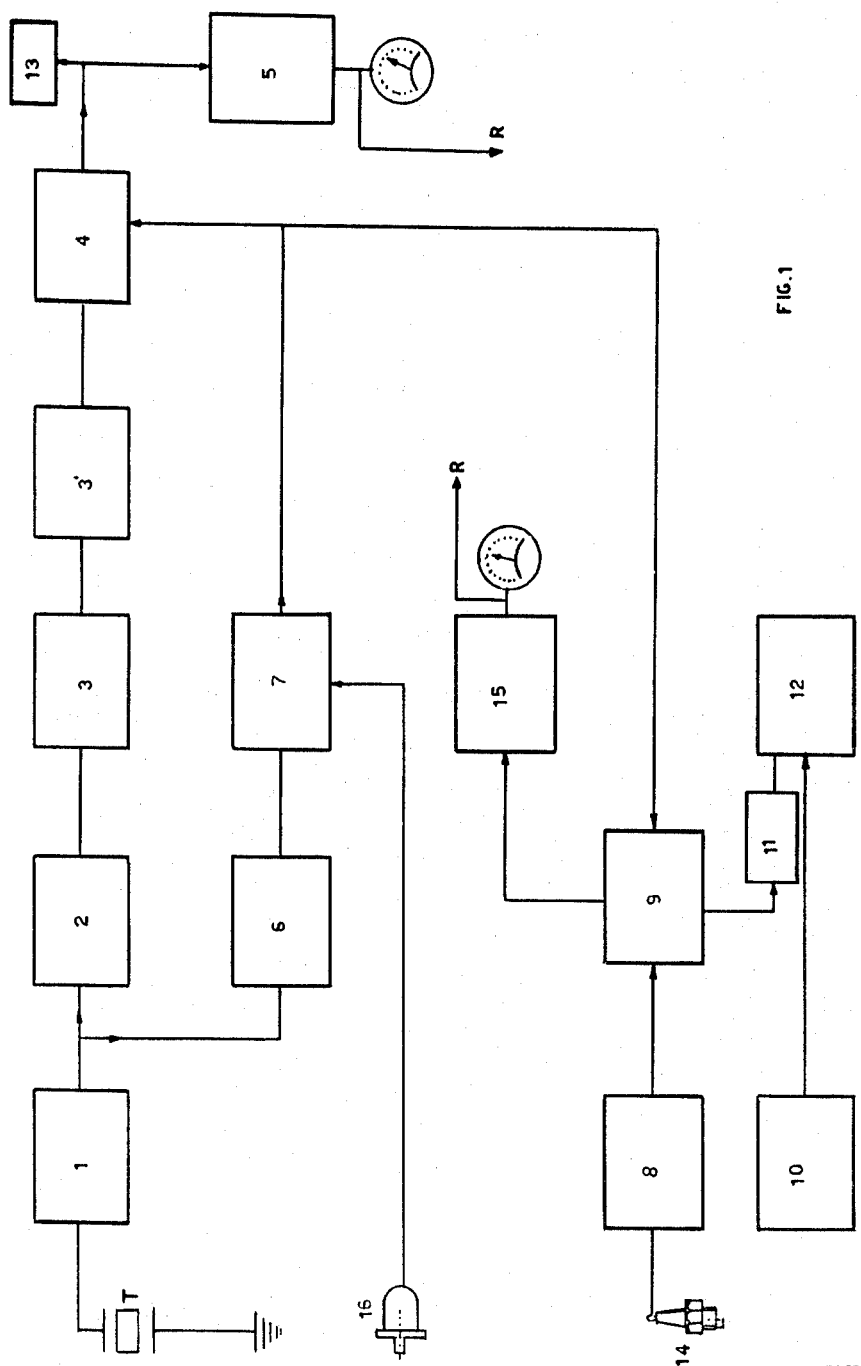

United States Patent
Arrigoni et al.

[15] 3,678,732

[45] July 25, 1972

[54] DEVICE FOR THE SIMULTANEOUS AND QUANTITATIVE DETECTION OF THE DETONATION AND PREIGNITION

[72] Inventors: Virgilio Arrigoni; Franco Sezzi, both of San Donato Milanese; Bruno Gaetani, Milan, all of Italy

[73] Assignee: Snam Progetti S.p.A., Milan, Italy

[22] Filed: March 11, 1970

[21] Appl. No.: 18,422

[30] Foreign Application Priority Data

March 11, 1969 Italy..................................13915 A/69

[52] U.S. Cl...................................................................73/35
[51] Int. Cl. .........................................................G01m 15/00
[58] Field of Search........................................................73/35

[56] References Cited

UNITED STATES PATENTS 3,010,313  11/1961  Weller, Jr. ...........................73/35 X
3,247,705  4/1966  Wostl......................................73/35

Primary Examiner—Jerry W. Myracle
Attorney—Ralph M. Watson

[57] ABSTRACT

A system for simultaneously and quantitatively measuring the detonation and preignition in an internal combustion engine by evaluating the pressure variations in an engine cylinder for a given time after peak pressure in the cylinder and by evaluating a signal having frequency proportional to engine speed for a period between the occurrence of an ignition signal and peak pressure.

4 Claims, 2 Drawing Figures

DEVICE FOR THE SIMULTANEOUS AND QUANTITATIVE DETECTION OF THE DETONATION AND PREIGNITION

A system for simultaneously and quantitatively measuring the detonation and preignition in an internal combustion engine by evaluating the pressure variations in an engine cylinder for a given time after peak pressure in the cylinder and by evaluating a signal having frequency proportional to engine speed for a period between the occurrence of an ignition signal and peak pressure.

The present invention relates to a device for the simultaneous and quantitative evaluation of the detonation and preignition in an internal combustion engine.

The trend to high compression ratios in the engines for motor vehicles has increased interest in the study and the evaluation of the detonation and preignition phenomena. Such studies are quite necessary in the development both of the fuel and of the engines.

Different devices for measuring the detonation and the preignition have been proposed; these devices cannot, however, evaluate simultaneously the two phenomena through a single transducer.

Generally the detonation is evaluated by means of the measurement of temperatures, of mechanical vibrations, more often by surveying the course of pressure in the cylinder; in an internal combustion engine, however, besides the pressure oscillations typical of the detonation, there are often other vibrations of pressure and disturbances which mask the main phenomenon.

The preignition evaluation generally is obtained on the basis of temperature measurements and the course of the flame front revealed by means of ionization transducers; these systems allow only qualitative measurements and, in the case of ionization transducers, require the presence of many transducers.

The object of the present invention is the to evaluation, quantitatively and simultaneously, by means of a single pressure transducer, of both the detonation and the preignition.

The measurement of the detonation is based on the known principle of evaluation of the pressure oscillations, which are characteristics of the phenomenon; our measurement is however carried out by a new circuit which eliminates the always present disturbance phenomena masking generally the same measurements. On the contrary the preignition is revealed through the characteristic advance displacement of the highest pressure point.

Figure 2:
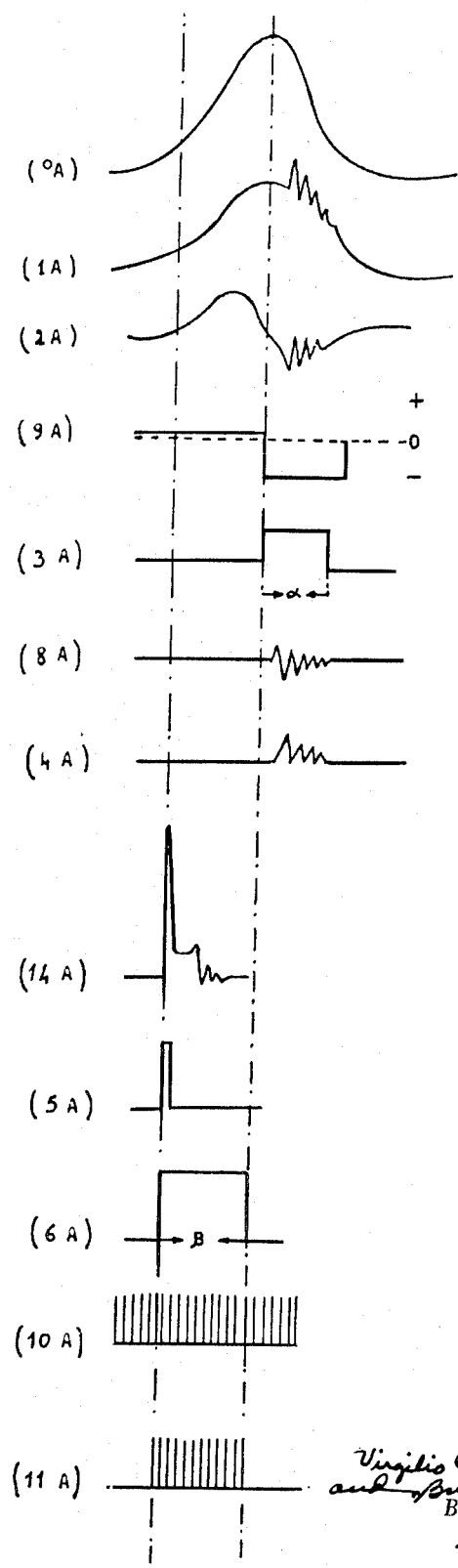

The invention is better illustrated by the enclosed FIGS., where the reference numerals without letter relate to the block scheme (FIG. 1) whereas the ones followed by the letter A relate to the course of the signals (FIG. 2).

With reference to the FIGS., we have:

FIG. 1

T represents a transducer;
1 represents an electrometric amplifier;
2 represents an attenuator
3 represents a passive networks filter;
3' represents a device restoring the level;
4 represents a gate;
5 represents a mean value indicator;
6 represents a shunter;
7 represents a monovibrator controlled in duration;
8 represents a pulse shaper from the spark plug;
9 represents a bistable circuit;
10 represents a pulse generator;
11 represents a gate;
12 represents a digital counter;
13 represents an integrator;
14 represents a spark plug;
15 represents a mean value indicator;
16 represents a tachydynamo
R represents recording systems.

FIG. 2

0A represents a pressure cycle;
1A represents a pressure cycle with oscillations due to the detonation;
2A represents a signal which is the signal derived from (1A);
9A represents a signal obtained by eliminating the positive part of (2A) and by amplifying up to the saturation the negative part;
3A represents a gate pilot signal; this signal is allowed to start from the first front of (9A) and it has a duration $\tau=1/w$ where $w$ is the engine speed;
8A represents a signal after filter 3;
4A represents a signal at the indicator input;
14A represents an ignition signal;
5A represents a pulse corresponding to the ignition signal;
6A represents a preignition signal;
10A represents pulses having frequency proportional to the engine speed $w$;
11A represents a signal for the digital evaluation of the preignition.

The signals coming from a piezoelectric pressure transducer (T), located in the engine combustion chamber, are sent to the electronic amplifier (1) which converts the electric charges generated by the transducer into electric signals corresponding to the variation of pressure in the combustion chamber. The output signal from (1) is applied simultaneously to the shunter circuit (6) and to the attenuator (2).

The output signal of the variable attenuator (2) is, therefore, applied to the high-pass filter (3) of passive networks type. The function of the filter is to separate the low frequency signal of the cycle from the one of detonation having high frequency (8A). The filter allows the passage of signals having frequency (8A). The filter allows the passage of signals having frequency higher than 5,000 Hz.

After the filter, the signal is restored at direct current (otherwise the mean value would result null) (4A) and with positive polarity and is sent to the gate (4).

Signal (1A) coming from the electronic amplifier (1) is simultaneously applied to the shunter circuit (6) and to the attenuator (2), to develop the first derivative of signal (1A). Circuit (6) is a resistance and capacity shunter circuit type. The shunted signal (2A), for the propriety of derivatives, passes through the zero when the signal corresponding to the change of the pressure presents its highest value. By making use of this sign inversion and amplifying suitably only the negative polarity, a signal (9A) is obtained, Which is used to syncronize the monovibrator circuit which follows (7). This last circuit (7) gives in this way a signal (3A) which begins in coincidence with the highest pressure point. Monovibrator (7) is also controlled in duration by the voltage given by a tachydynamo (16); this voltage is proportional to the engine speed. For the property of the monovibrators controlled in duration, signal (3A), will have a time $\tau$ invermely proportional to the control voltage and therefore to the engine speed $w$. The corresponding angle $\alpha$ of rotation of the crankshaft results $\alpha=w\tau=w(k/w=k$, *i.e., constant when speed changes. The angle is chosen in such a way that in it fall usually the detonation phenomena; in fact it has been observed that pressure oscillations, characteristic of the detonation, fall in an angle comprised between 60° and 120° starting from the point of highest pressure.*

Signal (3A) controls gate (4) which allows the arrival of the signals to subsequent circuits of evaluation only for the time corresponding to the above-mentioned angle; for the remaining time each signal and consequently the disturbances being suppressed.

The following circuit indicator is a mean value meter, having a time constant of few seconds, which evaluates the oscillation train (4A) produced by the detonation. There is also an electronic integrator (13), producing the integral of signals relating to oscillations (4A) produced by the detonation.

The mean value and the integral value are indicated and registered.

For measuring the preignition use is made of the beginning part of the above cited circuits (1,6,7), e.g. the one giving a signal (3A), whose first wave front corresponds to the maximum pressure point.

The preignition ratio is in fact measured by the advance of the maximum pressure point.

This evaluation is obtained by measuring, in an analog or digital way, the angle comprised between the driving shaft (preignition point, top dead center and others) and the signal corresponding to the maximum pressure point.

We show now the circuit used when the shifting angle is calculated starting from the ignition moment (in this case we neglect the action of the varying spark advance). The high voltage necessary for the ignition, gives by means of a potential divider and a pulse shaper circuit (8) a pulse (5A) coincident with the first wave front of ignition voltage (whose timing is known and measurable).

This pulse (5A) drives a bistable circuit (9) which is reset by maximum pressure peak signal (3A); the resulting pulse (6A) has duration equivalent to the $\beta$ angle between the ignition and the maximum pressure peak.

As the ignition timing is constant and well known, it is possible to know by the decrease of this angle the advance of the maximum pressure peak and therefore the preignition.

For the measurements, the output signal is applied to the mean value indicator circuit, whose indication proportional to the signal duration (6A) as to the cycle duration, results proportional to the $\beta$ angle. The pulse (5A) is also applied to circuit (11) consisting of an electronic gate) allowing, for the duration of signal (6A), the passage of signals having the frequency proportional to the engine angular speed (and having a period corresponding to an angular rotation).

These pulses (10A) are produced e.g. by a transducer (e.g. magnetic or optical transducer) reading a graduated circle connected with the driving shaft, or by a voltage-frequency electronic converter driven by the voltage of the tachydynamo.

The pulses transmitted by a gate (11A) are applied to the digital counter (12) allowing the reading of the number of pulses and therefore the angular range between the ignition and the top dead center.

If the mean value is required for many cycles, use is made of a measurements over many cycles (e.g. 1,000) and said measurement is divided by the number of cycle counted by a second digital counter storing e.g. the ignition number (signal 5A) i.e. the number of cycles.

We claim:

1. A system for simultaneously and quantitatively determining the detonation and preignition in an internal combustion engine, in response to an ignition signal, including:

a single transducer operably connected to said engine for producing signals in accordance with the variations in pressure within said engine;

peak pressure circuit means operably connected to said transducer and responsive thereto for producing a detonation gating signal of predetermined duration when the pressure in said engine attains a maximum value;

detonation gating circuit means operably connected to said transducer and to said peak pressure circuit meanS for enabling transmission of the transducer signals upon occurrence of said detonation gating signal;

pulse generator means for producing a train of pulses having a frequency proportional to the speed of said engine;

gate generator circuit means operably connected to said peak pressure circuit means and responsive to said ignition signal and to said detonation gating signal for producing a preignition gating signal having a duration defined by said ignition signal and said detonation gating signal;

preignition gating circuit means operably connected to said pulse generator and to said gate generator circuit for enabling transmission of said train of pulses upon occurrence of said preignition gating signal; and measuring means operably connected to said detonation gating circuit and to said preignition gating circuit and responsive to the transmitted transducer signals and to the transmitted train of pulses for evaluating same.

2. A system according to claim 1 wherein said peak pressure circuit means includes a monostable multivibrator triggered by the peak pressure event.

3. A system according to claim 2 wherein the duration of the output of said monostable multivibrator is a function of engine speed.

4. A system according to claim 1 wherein said gate generator circuit means includes a bistable multivibrator which is set by said ignition signal and reset by said detonation gating signal.

* * * * *

PO-1050
(5/69)

UNITED STATES PATENT OFFICE
CERTIFICATE OF CORRECTION

Patent No. 3,678,732               Dated July 25, 1972

Inventor(s) Virgilio Arrigoni, et al

It is certified that error appears in the above-identified patent and that said Letters Patent are hereby corrected as shown below:

Column 1, line 36, delete "to".

Column 2, line 33, delete the entire line.

Column 2, line 53, should read as follows: -- ration, signal (3A), will have a time $\tau$ inversely proportional --.

Signed and sealed this 21st day of May 1974.

(SEAL)
Attest:

EDWARD M.FLETCHER,JR.
Attesting Officer

C. MARSHALL DANN
Commissioner of Patents